(12) United States Patent
Huang (10) Patent No.: US 12,152,683 B2
(45) Date of Patent: Nov. 26, 2024

(54) PRESSURE RELIEF VALVE AND INFLATABLE POOL

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shangha (CN)

( * ) Notice: Subject to any disclaimer, the term of this patent is extended or adjusted under 35 U.S.C. 154(b) by 132 days.

(21) Appl. No.: 17/945,617

(22) Filed: Sep. 15, 2022

(65) Prior Publication Data

US 2023/0332703 A1    Oct. 19, 2023

(30) Foreign Application Priority Data

Apr. 15, 2022    (CN) .......................... 202220873531.1

(51) Int. Cl.
*F16K 17/04*    (2006.01)
*E04H 4/00*    (2006.01)
*F16K 27/02*    (2006.01)

(52) U.S. Cl.
CPC ....... *F16K 17/0413* (2013.01); *E04H 4/0025* (2013.01); *F16K 27/0236* (2013.01)

(58) Field of Classification Search
CPC .. F16K 17/0413; F16K 27/0236; F16K 17/06; E04H 4/0025; E04H 4/00
See application file for complete search history.

(56) References Cited

U.S. PATENT DOCUMENTS

| 3,027,915 A | * | 4/1962 | Huffman | ............. | F16K 17/0406 137/859 |
| 3,032,060 A | | 5/1962 | Huffman | | |
| 3,147,763 A | * | 9/1964 | Morton | ................ | A47C 27/081 251/351 |
| 3,260,276 A | * | 7/1966 | Stasiunas | ................ | F16K 15/20 251/351 |

(Continued)

FOREIGN PATENT DOCUMENTS

| CN | 202056366 | 11/2011 |
| EP | 3444510 | 2/2019 |

OTHER PUBLICATIONS

Extended European Search Report dated Mar. 27, 2023 (Mar. 27, 2023), 8 pages, issued on related European patent application 22201019.1 by the European Patent Office.

*Primary Examiner* — Daphne M Barry
(74) *Attorney, Agent, or Firm* — DICKINSON WRIGHT PLLC (57) ABSTRACT

A pressure relief valve for an inflatable device, and an inflatable pool including the pressure relief valve are provided. The pressure relief valve includes: a valve seat configured to connect to the inflatable device; and a valve body. The valve body is disposed at least partially within the valve seat and includes a valve shell, comprising a vent hole therein, and a valve diaphragm arranged at a bottom of the valve shell. The valve diaphragm is moveable between a closed position in which the vent hole is closed and an open position in which the vent hole is open. The valve body further includes a spring and a valve diaphragm fixing part arranged around the vent hole. The valve shell and the valve diaphragm fixing part are connected to each other, and the spring is biased to push the valve diaphragm into the closed position.

8 Claims, 6 Drawing Sheets

(56) References Cited

U.S. PATENT DOCUMENTS

| | | | | |
|---|---|---|---|---|
| 4,392,512 A | * | 7/1983 | Kreeley | F16K 17/0453 137/859 |
| 4,766,628 A | * | 8/1988 | Walker | A47C 27/082 137/232 |
| 8,297,309 B2 | * | 10/2012 | Wang | F04D 25/084 137/224 |
| 9,228,496 B2 | * | 1/2016 | West | F02C 9/18 |
| 2005/0125904 A1 | * | 6/2005 | Tsai | F04B 39/00 5/713 |
| 2010/0247355 A1 | * | 9/2010 | Pan | F04D 25/084 417/423.14 |

\* cited by examiner

PRESSURE RELIEF VALVE AND INFLATABLE POOL

CROSS-REFERENCE TO RELATED APPLICATION

This application claims priority from Chinese Application CN 202220873531.1 filed Apr. 15, 2022 in China, the disclosure of which is incorporated herein by reference in its entirety.

BACKGROUND

1. Field

Apparatuses and methods consistent with example embodiments relate to a pressure relief valve for an inflatable pool, and to an inflatable pool that includes the pressure relief valve.

2. Description of the Related Art

A safety valve is often disposed on an inflatable pool wall of an inflatable pool. The safety valve has a pressure relief function to prevent explosion due to high internal air pressure of the inflatable pool wall.

However, defects in existing products may include: the complex structure of the valve; and a spring with a set recovery force being pre-produced, resulting in that the safety valve using the spring has only one fixed pressure relief value which cannot be adjusted based on an actual need.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a pressure relief valve is provided, comprising: a valve seat configured to be attached to an inflatable device; and a valve body, wherein the valve body is disposed at least partially within the valve seat and comprises: a valve shell comprising therein a vent hole, a valve diaphragm disposed at a bottom of the valve shell, the valve diaphragm moveable between a closed position in which the valve diaphragm closes the vent hole and an open position in which the valve diaphragm opens the vent hole, a spring biased to push the valve diaphragm into the closed position, and a valve diaphragm fixing part disposed around the vent hole and connected to the valve shell.

The valve body may further comprise a first spring seat and a second spring seat, wherein the spring is disposed between the first spring seat and the second spring seat.

The first spring seat may be connected to the valve diaphragm and biased by the spring in a longitudinal direction of the valve diaphragm fixing part to press the valve diaphragm into the closed position, and the second spring seat may be connected to the valve diaphragm fixing part and adjustable to thereby limit a compression amount of the spring.

The valve diaphragm may comprise at least one support bar comprising a boss, the first spring seat comprising at least one through hole corresponding to the at least one support bar, and the support bar passing through the through hole and snaps to a surface of the first spring seat through the boss, thereby connecting the first spring seat to the valve diaphragm.

One of the first spring seat and the valve diaphragm fixing part may comprise a chute therein, and an other of the first spring seat and the valve diaphragm fixing part may comprise a protrusion portion corresponding to the chute, the chute configured to enable the protrusion portion to move within the chute along the longitudinal direction of the valve diaphragm fixing part and to restrict relative rotation between the first spring seat and the valve diaphragm fixing part.

The valve diaphragm fixing part may comprise a first valve diaphragm fixing part and a second valve diaphragm fixing part, wherein the first valve diaphragm fixing part is disposed between the valve diaphragm and the second valve diaphragm fixing part.

The second valve diaphragm fixing part may be connected to the valve shell and rest against the first valve diaphragm fixing part, thereby enabling the first valve diaphragm fixing part to press the valve diaphragm, and the second spring seat may be connected to the second valve diaphragm fixing part.

The second valve diaphragm fixing part may be connected to the valve shell by corresponding threading and comprise a positioning slot, and the first valve diaphragm fixing part may comprise a grab corresponding to the positioning slot, and configured to, by engagement with the positioning slot, prevent loosening of a connection of the second valve diaphragm fixing part to the valve shell.

The pressure relief valve may further comprise a cover body comprising an exhaust hole therethrough, the cover body fixed to one of the valve shell and the valve diaphragm fixing part.

The valve seat may comprise: a pool wall fixing part configured to connect the inflatable device, and a base, wherein the base and the pool wall fixing part are injection molded and are connected to the valve shell.

The pressure relief valve may further comprise a sealing gasket disposed between the base and the valve shell.

According to an aspect of another example embodiment, an inflatable pool is provided, comprising: an inflatable pool wall, and the pressure relief valve, as described above, arranged on the inflatable pool wall.

The inflatable pool wall may comprise an outer wall and an inner wall, and the pressure relief valve may be connected to one of the outer wall and the inner wall.

According to an aspect of another example embodiment, an inflatable product is provided, comprising: an inflatable body comprising an inflatable wall; and a pressure relief valve comprising: a valve seat connected to the inflatable wall; a valve body comprising a valve shell comprising therein a vent hole, the valve shell disposed at least partially within the valve seat; a valve diaphragm disposed inside the valve shell and moveable between a closed position and an open position; and a spring disposed within the valve shell and operationally connected to the valve diaphragm such that a change in an internal air pressure of the inflatable body causes a change in the compression and decompression of the spring and a corresponding movement of the valve diaphragm.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

In this description, directional expressions such as "upper", "lower", "top", and "bottom" are not absolute, but relative. The directional expressions are appropriate when various components are arranged as shown in the figures, but should change accordingly when positions of the various components in the figures change. In addition, "inner" and "outer" are defined with reference to radial inner and outer directions of a shown inflatable pool.

Figure 1:
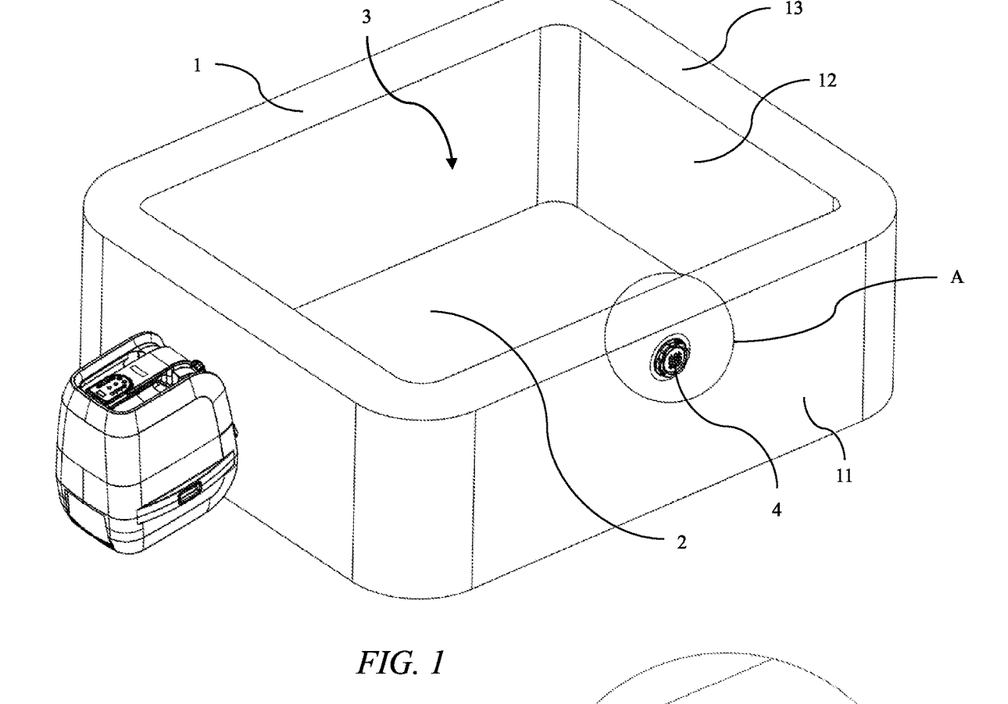
FIG. 1 is a schematic diagram of an overall structure of an inflatable pool according to an example embodiment.
Figure 2:
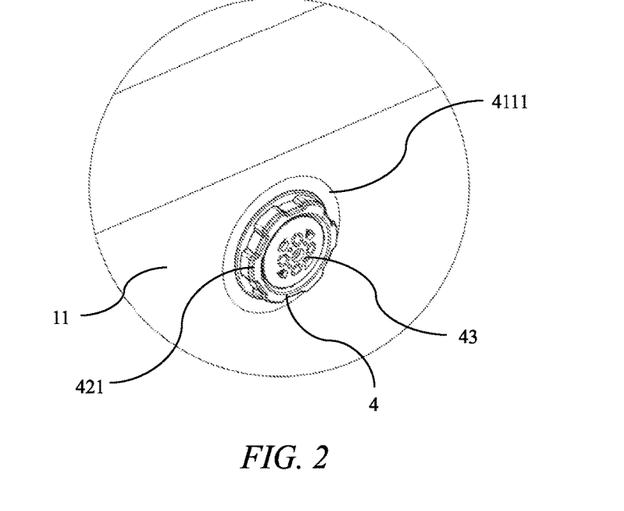
FIG. 2 is an enlarged schematic diagram of an area A in FIG. 1.
Figure 3:
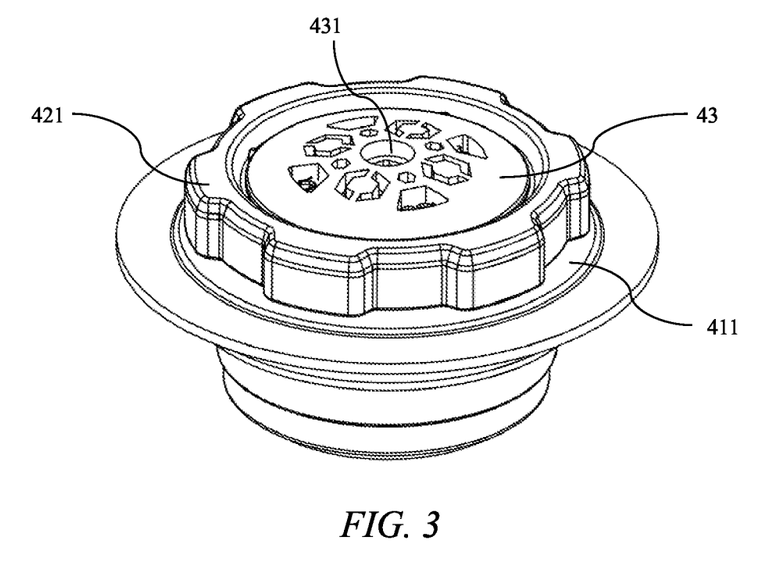
FIG. 3 is a schematic diagram of an overall structure of a pressure relief valve according to an example embodiment.
Figure 4:
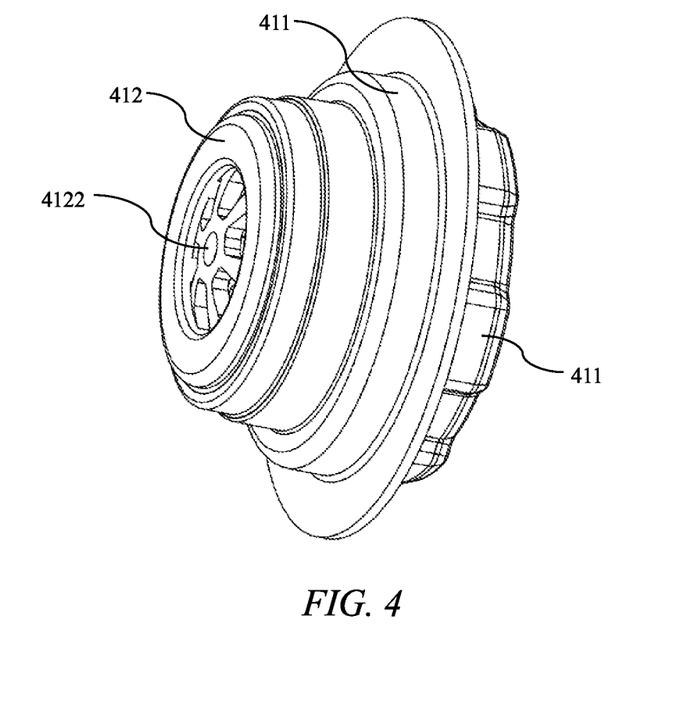
FIG. 4 is a schematic diagram of an overall structure of a pressure relief valve according an example embodiment, from another angle of view.

As shown in FIG. 1 and FIG. 2, an inflatable pool includes a pool bottom 2 and an inflatable pool wall 1 surrounding the pool bottom 2, the inflatable pool wall 1 and the pool bottom 2 jointly limit a water storage chamber 3 of the pool, and on the inflatable pool wall 1, a pressure relief valve 4 is included to perform pressure relief when internal air pressure of the inflatable pool wall 1 is too high, to prevent the inflatable pool wall 1 from explosion or other damage. Reasons that the internal air pressure of the inflatable pool wall 1 may become too high include but are not limited to: water inside the water storage chamber 3 entering the inflatable pool wall 1, causing an increase in the internal air pressure; and hot weather, where long exposure to the sun causes air in the inflatable pool wall 1 to expand.

It is noted that the pressure relief valve described herein is described with respect to an inflatable wall of an inflatable pool. However, it should be understood that the pressure relief valve described herein may be used in conjunction with any inflatable portion of a pool or with a non-pool inflatable device, such as, but not limited to an inflatable mattress and an inflatable pool accessory.

The inflatable pool wall 1 includes an outer wall 11, an inner wall 12, and a top wall 13 that jointly define the inflatable chamber. The inner wall 12 also limits the highest water level of the water storage chamber 3, and the pressure relief valve 4 may be arranged at any position in any of the outer wall 11, the inner wall 12, and the top wall 13. The pressure relief valve 4 may be arranged at a position of the outer wall 11 that is adjacent to the top wall 13, or may be arranged on the inner wall 12 above the highest water level line.

A first example embodiment of a pressure relief valve 4 will be described below in conjunction with FIG. 2 to FIG. 7.

As shown in FIG. 2 to FIG. 7, the pressure relief valve 4 includes a valve seat 41 and a valve body 42 arranged in the valve seat 41.

Figure 5:
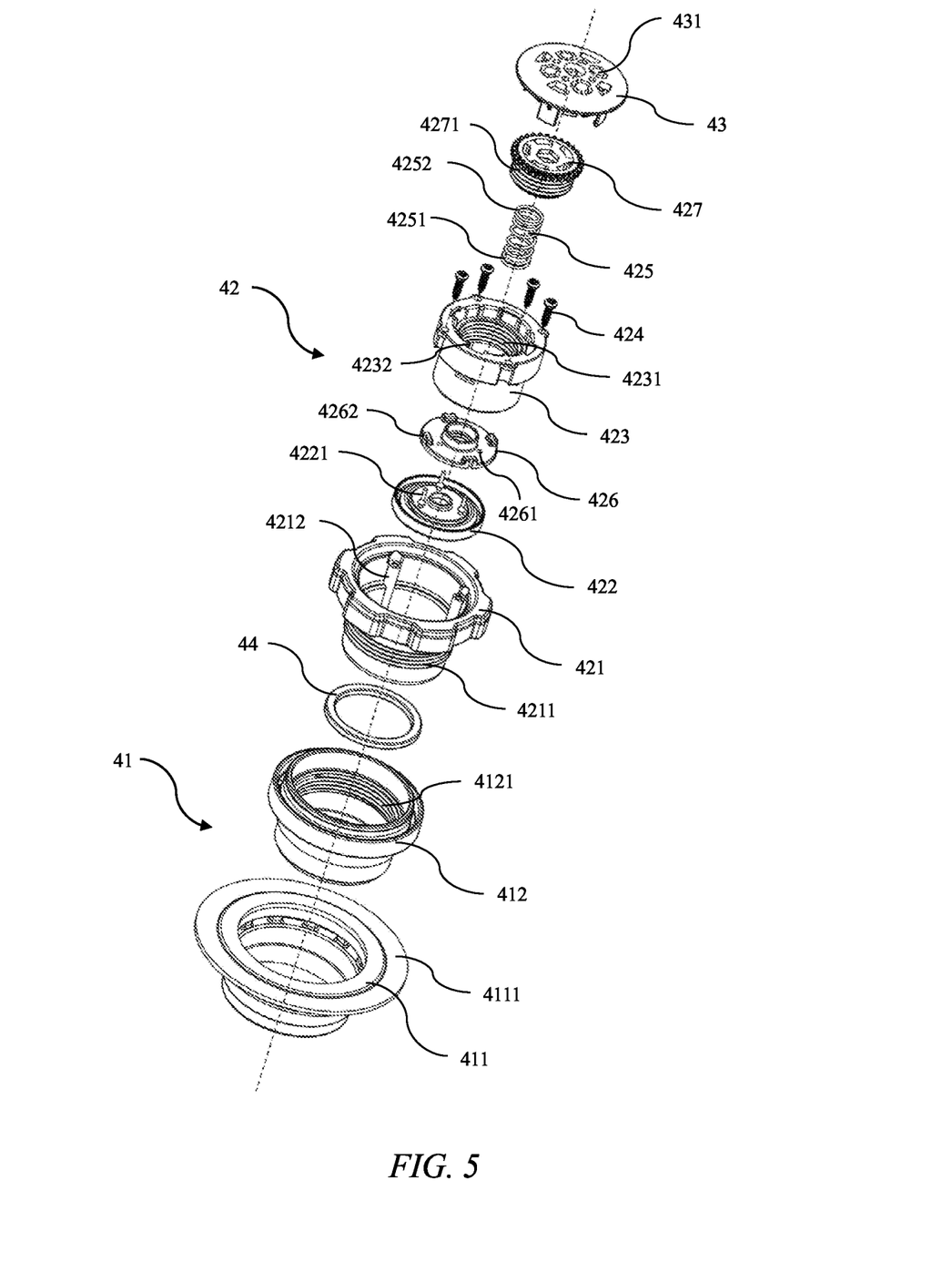
FIG. 5 is an exploded schematic diagram of a pressure relief valve according to an example embodiment.
Figure 6:
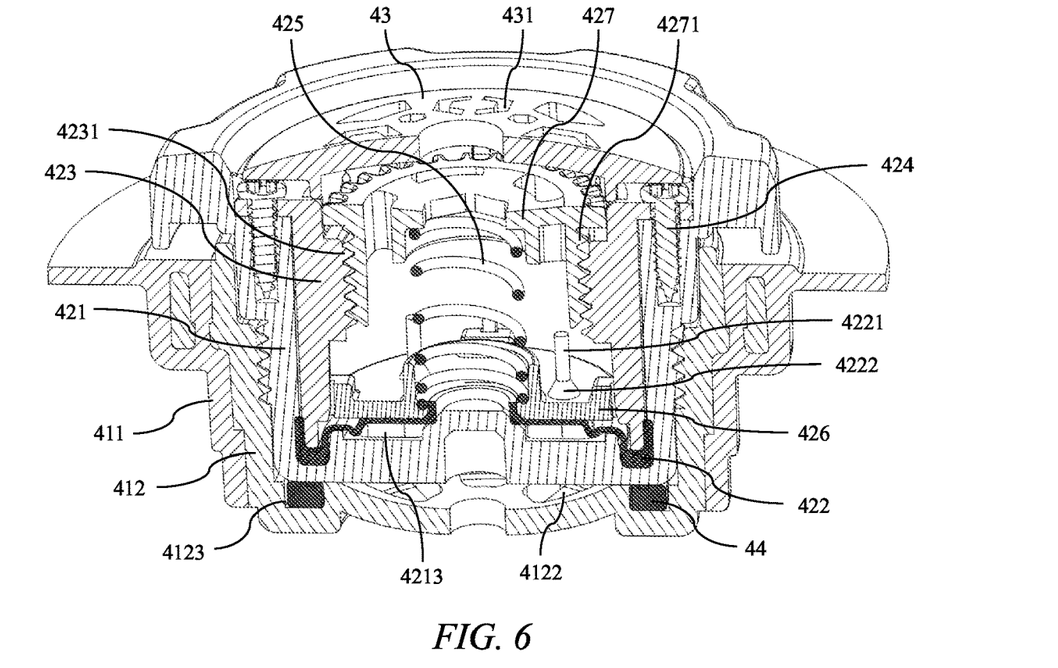
FIG. 6 is a cross-sectional schematic diagram of the pressure relief valve of FIG. 5, in which a vent hole is in a closed state.

The valve seat 41 may be attached to the inflatable pool wall 1 by high frequency welding. More specifically, the valve seat 41 includes a base 412 with a bottom exhaust hole 4122 and a pool wall fixing part 411 surrounding the base 412. The pool wall fixing part 411 and the base 412 are injection molded through rubberization and welded to the inflatable pool wall 1 by a peripheral flange 4111 of the pool wall fixing part 411. The base 412 is provided with a first internal thread 4121.

The valve body 42 includes: a valve shell 421 provided with a bottom vent hole 4213; a valve diaphragm 422, where the valve diaphragm 422 is arranged at a bottom of the valve shell 421 and is adapted to open or close the vent hole 4213; and a substantially tubular valve diaphragm fixing part 423 arranged around the vent hole 4213, where the valve diaphragm fixing part 423 is connected to the valve shell 421 to position the valve diaphragm 422 at the bottom of the valve shell 421.

More specifically, the valve shell 421 is provided with a first external thread 4211, to connect the valve shell 421 to the base 412 by screwing of the first external thread 4211 to the first internal thread 4121 of the base 412. In addition, the valve shell 421 is also provided with a plurality of bolt fixing parts 4212, and the valve diaphragm fixing part 423 is connected to the valve shell 421 by a plurality of bolts 424 (for example, four bolts 424 as shown) screwed into the bolt fixing parts 4212. The valve diaphragm fixing part 423 presses the valve diaphragm 422 around the vent hole 4213 and tightly to the bottom of the valve shell 421 so that the valve diaphragm 422 covers the vent hole 4213. More specifically, the valve diaphragm fixing part 423 presses an outer peripheral part of the valve diaphragm 422 to the bottom of the valve shell 421, and a middle part of the valve diaphragm 422 can still move to cover the vent hole 4213 so as to open or close the vent hole.

The valve body 42 further includes a compression spring 425 extending axially within the valve diaphragm fixing part 423. A first end 4251 of the spring 425 is connected to the valve diaphragm 422 by a first spring seat 426, and a second end 4252 of the spring 425 is connected to the valve diaphragm fixing part 423 by a second spring seat 427, so as to push the valve diaphragm 422 to move in a longitudinal direction of the valve diaphragm fixing part 423 (that is, a vertical direction in FIG. 6/an axial direction of the spring 425) by a predetermined pressure applied to the valve diaphragm 422 by the spring 425 through the first spring seat 426 to close the vent hole 4213, as shown in FIG. 6.

More specifically, the valve diaphragm 422 includes at least one support bar 4221 (for example, three support bars 4221 as shown) with a boss 4222, the first spring seat 426 includes at least one through hole 4261 matching the support bar 4221 (for example, three through holes 4261 matching the three support bars 4221), and each support bar 4221 passes through the corresponding through hole 4261 and snaps to a surface of the first spring seat 426 through the boss 4222 to connect the first spring seat 426 to the valve diaphragm 422.

The first spring seat 426 is movable relative to an inner wall of the valve diaphragm fixing part 423 so as to drive the valve diaphragm 422 to open or close the vent hole 4213. A radially outer edge of the first spring seat 426 may be provided with at least one chute 4262 (for example, four chutes 4262 as shown), and the inner wall of the valve diaphragm fixing part 423 is provided with at least one protrusion portion 4232 matching the chute 4262 (for example, four protrusion portions 4232 matching the four chutes 4262), to be adapted to enable each protrusion portion 4232 to move in the corresponding chute 4262 along the longitudinal direction of the valve diaphragm fixing part 423 and to restrict relative rotation between the first spring seat 426 and the valve diaphragm fixing part 423. The arrangement of the chute and the protrusion portion is merely an example, and is not restrictive. According to an alternate example aspect, the radially outer edge of the first spring seat 426 may be provided with at least one protrusion portion, and the inner wall of the valve diaphragm fixing part 423 may be provided with at least one chute matching the protrusion portion.

A position of the second spring seat 427 relative to the valve diaphragm fixing part 423 is configured to be adjustable to limit a compression amount of the spring 425, thereby limiting a predetermined pressure applied to the valve diaphragm 422 by the spring 425. The inner wall of the valve diaphragm fixing part 423 may be provided with a second internal thread 4231, and the second spring seat 427 may be provided with a second external thread 4271 matching the second internal thread 4231, so that the valve diaphragm fixing part 423 is threaded to the second spring seat 427 by screwing of the second internal thread 4231 to the second external thread 4271.

Before a product is shipped, a compression amount of the spring 425 may be adjusted by rotating the second spring seat 427 relative to the valve diaphragm fixing part 423, thereby adjusting the predetermined pressure applied to the valve diaphragm 422 by the spring 425. The predetermined pressure is a predetermined pressure relief value of the pressure relief valve 4. To be specific, the closer the second spring seat 427 is rotated to the first spring seat 426, the greater the compression amount of the spring 425 is, and therefore the greater the internal air pressure of the inflatable pool wall 1 that is required for the valve diaphragm 422 to open the vent hole 4213 to start pressure relief.

The pressure relief valve 4 may additionally include a cover body 43 with a top exhaust hole 431. The cover body 43 is fixed to the valve shell 421 or the valve diaphragm fixing part 423 at the top of the pressure relief valve 4 and covers parts such as the valve diaphragm 422, the spring 425, the first spring seat 426, and the second spring seat 427, providing an aesthetic effect of the pressure relief valve 4 while also providing protection.

The pressure relief valve 4 may further include a sealing gasket 44 arranged between the base 412 and the valve shell 421. The sealing gasket 44 is arranged around the bottom exhaust hole 4122 at a position at which a bottom of the base 412 is in contact with the valve shell 421, for example, is arranged into a first groove 4123 formed at the bottom of the base 412, to ensure that air does not leak from between the base 412 and the valve shell 421.

Figure 7:
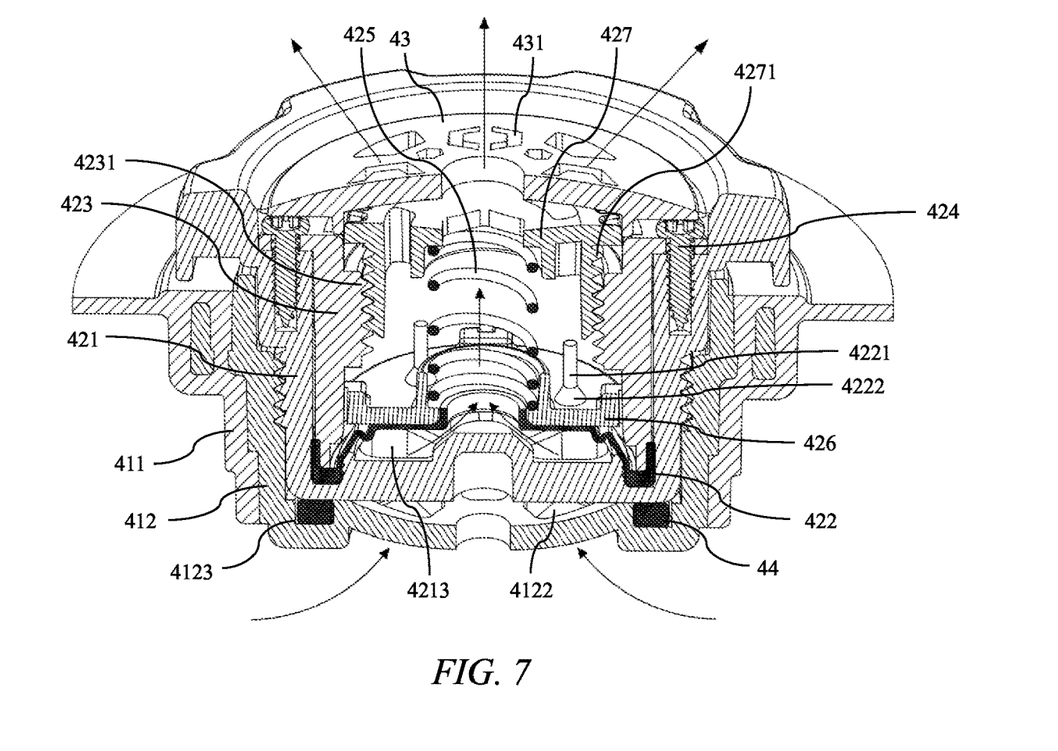
FIG. 7 is a cross-sectional schematic diagram of the pressure relief valve of FIG. 5, in which a vent hole is in an open state.

As shown in FIG. 7, only when the internal air pressure of the inflatable pool wall 1 is greater than the predetermined pressure (that is, being greater than the predetermined pressure relief value of the pressure relief valve 4) applied to the valve diaphragm 422 by the spring 425, the air pushes the valve diaphragm 422 and the first spring seat 426 upward from inside of the inflatable pool wall 1, the vent hole 4213 opens accordingly, and the air is discharged through a vent passage (for example, a vent passage shown by an arrow in FIG. 7, where the vent passage passes through the bottom exhaust hole 4122 formed at the base 412, the vent hole 4213 formed at the valve shell 421, exhaust holes formed at the first spring seat 426 and the second spring seat 427, and the top exhaust hole 431 formed at the cover body 43). As shown in FIG. 6, when the internal air pressure of the inflatable pool wall 1 decreases, the valve diaphragm 422 and the first spring seat 426 are pushed back on the basis of a reaction force of the spring 425, to close the vent hole 4213 again.

A second example embodiment of the pressure relief valve 4 will be described below in conjunction with FIG. 8 to FIG. 10.

Figure 8:
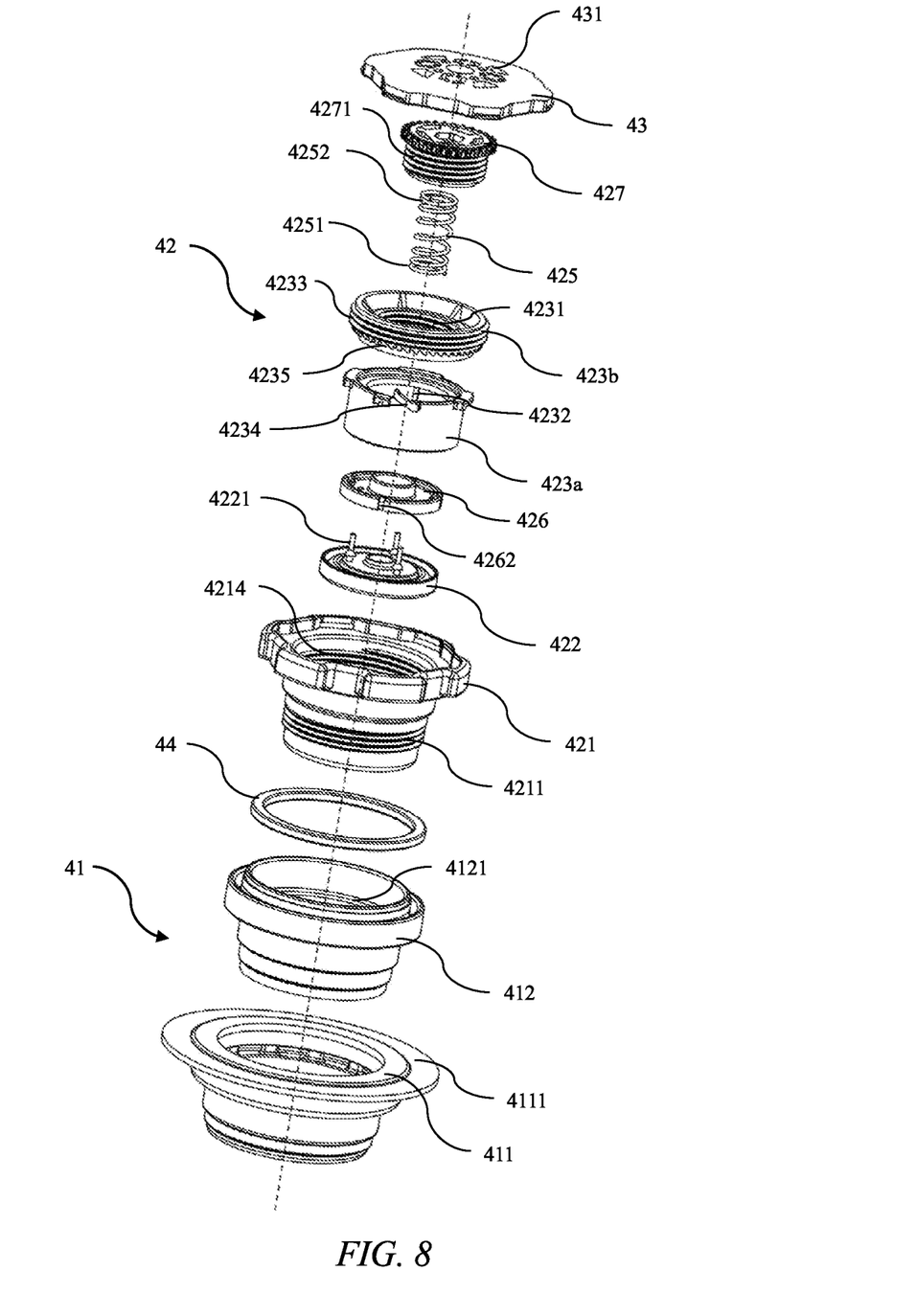
FIG. 8 is an exploded schematic diagram of a pressure relief valve according to another example embodiment.
Figure 9:
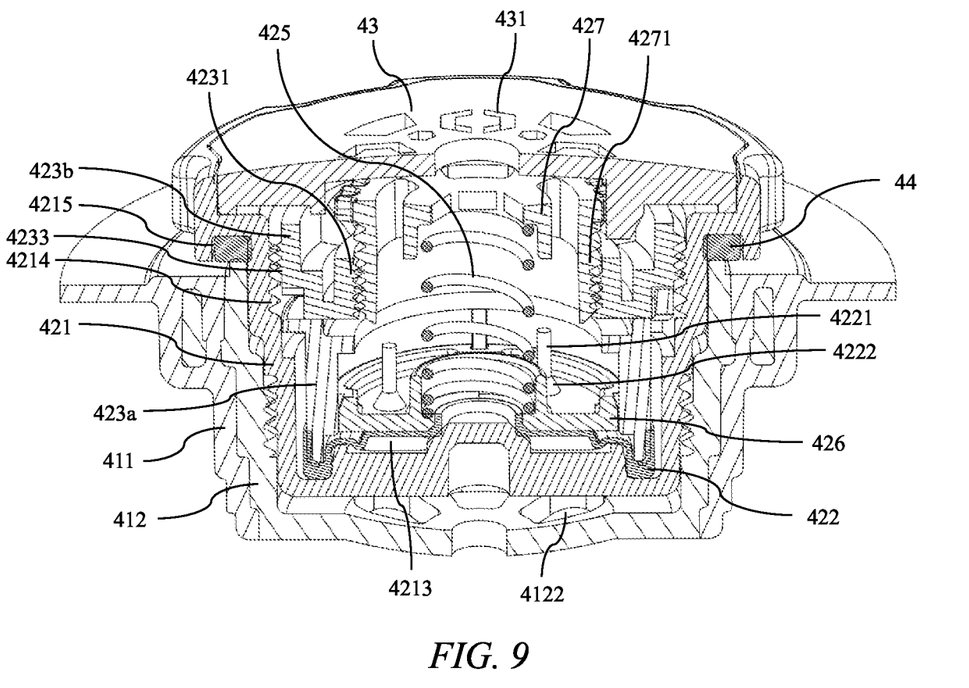
FIG. 9 is a cross-sectional schematic diagram of the pressure relief valve of FIG. 8, in which a vent hole is in a closed state.
Figure 10:
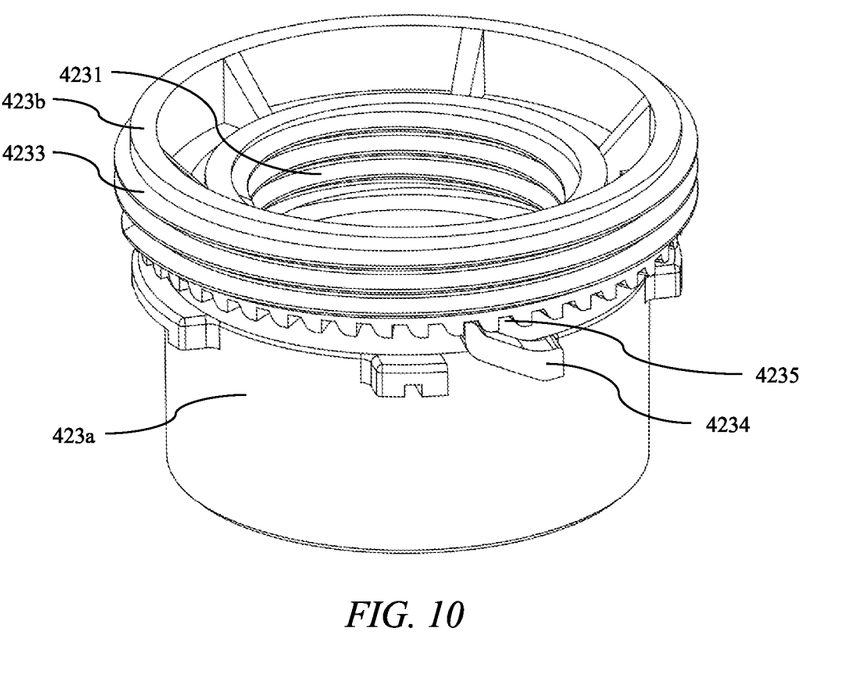
FIG. 10 is a schematic diagram of a structure of a valve diaphragm fixing part of the pressure relief valve of FIG. 8.

As shown in FIG. 8 to FIG. 10, a pressure relief principle of the pressure relief valve 4 in the second example embodiment is similar to that in the first example embodiment, and therefore similarities in construction are not repeated. Differences mainly lie in that a valve diaphragm fixing part 423 includes a first valve diaphragm fixing part 423a arranged at a bottom of the valve shell 421, and a second valve diaphragm fixing part 423b arranged at a top of the first valve diaphragm fixing part 423a. Thus, the first valve diaphragm fixing part 423a is arranged between the valve diaphragm 422 and the second valve diaphragm fixing part 423b. An inner wall of the valve shell 421 is provided with a third internal thread 4214, the second valve diaphragm fixing part 423b is provided with a third external thread 4233 matching the third internal thread 4214, so as to make the second valve diaphragm fixing part 423b connect to the valve shell 421 and rest tightly against the first valve diaphragm fixing part 423a by screwing of the third internal thread 4214 to the third external thread 4233, so that the first valve diaphragm fixing part 423a presses the valve diaphragm 422 around the vent hole 4213 tightly to the bottom of the valve shell 421.

The first spring seat 426 is movable relative to an inner wall of the first valve diaphragm fixing part 423a to drive the valve diaphragm 422 to open or close the vent hole 4213. A radially outer edge of the first spring seat 426 may be provided with at least one chute 4262, and the inner wall of the first valve diaphragm fixing part 423a may be provided with at least one protrusion portion 4232 matching the chute 4262, to be adapted to enable each protrusion portion 4232 to move in the corresponding chute 4262 along a longitudinal direction of the first valve diaphragm fixing part 423*a* and to restrict relative rotation between the first spring seat 426 and the first valve diaphragm fixing part 423*a*.

An inner wall of the second valve diaphragm fixing part 423*b* is provided with a second internal thread 4231, and the second spring seat 427 is provided with a second external thread 4271 matching the second internal thread 4231, so that the second valve diaphragm fixing part 423*b* is threaded to the second spring seat 427 by screwing of the second internal thread 4231 to the second external thread 4271, so that a compression amount of the spring 425 can be adjusted by rotating the second spring seat 427 relative to the second valve diaphragm fixing part 423*b*.

To prevent the threaded connection between the second valve diaphragm fixing part 423*b* and the valve shell 421 from loosening during shipping or use, a bottom of the second valve diaphragm fixing part 423*b* may be provided with a positioning slot 4235 towards the first valve diaphragm fixing part 423*a*. A top of the first valve diaphragm fixing part 423*a* is provided with a grab 4234 matching the positioning slot 4235. Engagement of the grab 4234 and the positioning slot 4235 prevents the second valve diaphragm fixing part 423*b* from reversing after being screwed to the valve shell 421, so as to prevent loose connection from affecting normal use of the pressure relief valve 4.

Additionally, the pressure relief valve 4 may further include a sealing gasket 44 arranged between the base 412 and the valve shell 421. The sealing gasket 44 is arranged at a position at which a top of the base 412 is in contact with the valve shell 421, for example, is arranged into a second groove 4215 formed at a top of the valve shell 421, to ensure that air does not leak from between the base 412 and the valve shell 421.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A pressure relief valve, comprising:
   a valve seat configured to be attached to an inflatable device; and
   a valve body at least partially disposed within the valve seat and comprising:
      a valve shell comprising therein a vent hole,
      a valve diaphragm disposed at a bottom of the valve shell and comprising at least one support bar comprising a boss, the valve diaphragm moveable between a closed position in which the valve diaphragm closes the vent hole and an open position in which the valve diaphragm opens the vent hole,
      a spring biased to push the valve diaphragm into the closed position,
      a valve diaphragm fixing part disposed around the vent hole and connected to the valve shell,
      a first spring seat connected to the valve diaphragm and biased by the spring in a longitudinal direction of the valve diaphragm fixing part to press the valve diaphragm into the closed position, the first spring seat comprises at least one through hole corresponding to the at least one support bar of the valve diaphragm, and
      a second spring seat connected to the valve diaphragm fixing part and configured to be adjusted to limit a compression amount of the spring disposed between the first spring seat and the second spring seat,
   wherein the support bar passes through the through hole and snaps to a surface of the first spring seat through the boss, thereby connecting the first spring seat to the valve diaphragm.

2. The pressure relief valve according to claim 1, wherein:
   the valve seat comprises:
      a base provided with first internal threading and a bottom exhaust hole, and
      a pool wall fixing part surrounding the base;
   the valve shell is provided with first external threading; and the valve shell is configured to connect to the base by means of screwing the first external threading into the first internal threading.

3. A pressure relief valve, comprising:
   a valve seat configured to be attached to an inflatable device; and
   a valve body at least partially disposed within the valve seat and comprising:
      a valve shell comprising therein a vent hole,
      a valve diaphragm disposed at a bottom of the valve shell, the valve diaphragm moveable between a closed position in which the valve diaphragm closes the vent hole and an open position in which the valve diaphragm opens the vent hole,
      a spring biased to push the valve diaphragm into the closed position,
      a valve diaphragm fixing part disposed around the vent hole and connected to the valve shell,
      a first spring seat connected to the valve diaphragm and biased by the spring in a longitudinal direction of the valve diaphragm fixing part to press the valve diaphragm into the closed position, and
      a second spring seat connected to the valve diaphragm fixing part and configured to be adjusted to limit a compression amount of the spring disposed between the first spring seat and the second spring seat,
   wherein: one of the first spring seat and the valve diaphragm fixing part comprises a chute therein, and another of the first spring seat and the valve diaphragm fixing part comprises a protrusion portion corresponding to the chute, the chute configured to enable the protrusion portion to move within the chute along the longitudinal direction of the valve diaphragm fixing part and to restrict relative rotation between the first spring seat and the valve diaphragm fixing part.

4. The pressure relief valve according to claim 3, wherein:
   the valve seat comprises:
      a base provided with first internal threading and a bottom exhaust hole, and
      a pool wall fixing part surrounding the base;
   the valve shell is provided with first external threading;

and the valve shell is configured to connect to the base by means of screwing the first external threading into the first internal threading.

5. A pressure relief valve, comprising:
a valve seat configured to be attached to an inflatable device; and
a valve body at least partially disposed within the valve seat and comprising:
  a valve shell comprising therein a vent hole,
  a valve diaphragm disposed at a bottom of the valve shell, the valve diaphragm moveable between a closed position in which the valve diaphragm closes the vent hole and an open position in which the valve diaphragm opens the vent hole,
  a spring biased to push the valve diaphragm into the closed position,
  a valve diaphragm fixing part disposed around the vent hole and connected to the valve shell,
  a first spring seat connected to the valve diaphragm and biased by the spring in a longitudinal direction of the valve diaphragm fixing part to press the valve diaphragm into the closed position, and
  a second spring seat connected to the valve diaphragm fixing part and configured to be adjusted to limit a compression amount of the spring disposed between the first spring seat and the second spring seat;
wherein the valve diaphragm fixing part comprises a first valve diaphragm fixing part and a second valve diaphragm fixing part, wherein the first valve diaphragm fixing part is disposed between the valve diaphragm and the second valve diaphragm fixing part, wherein the second spring seat is connected to the second valve diaphragm fixing part,
wherein the second valve diaphragm fixing part is connected to the valve shell by corresponding threading and comprises a positioning slot and rests against the first valve diaphragm fixing part, thereby enabling the first valve diaphragm fixing part to press the valve diaphragm, and
wherein the first valve diaphragm fixing part comprises a grab corresponding to the positioning slot, and is configured to, by engagement with the positioning slot, prevent loosening of a connection of the second valve diaphragm fixing part to the valve shell.

6. The pressure relief valve according to claim 5, wherein:
the valve seat comprises:
  a base provided with first internal threading and a bottom exhaust hole, and
  a pool wall fixing part surrounding the base;
the valve shell is provided with first external threading;
and the valve shell is configured to connect to the base by means of screwing the first external threading into the first internal threading.

7. An inflatable pool, comprising:
an inflatable wall, and the pressure relief valve according to one of claims 1, 3, and 5, arranged on the inflatable wall.

8. The inflatable pool according to claim 7, wherein the inflatable wall comprises an outer wall and an inner wall, and the pressure relief valve is connected to one of the outer wall and the inner wall.

* * * * *